United States Patent Office 3,558,165
Patented Jan. 26, 1971

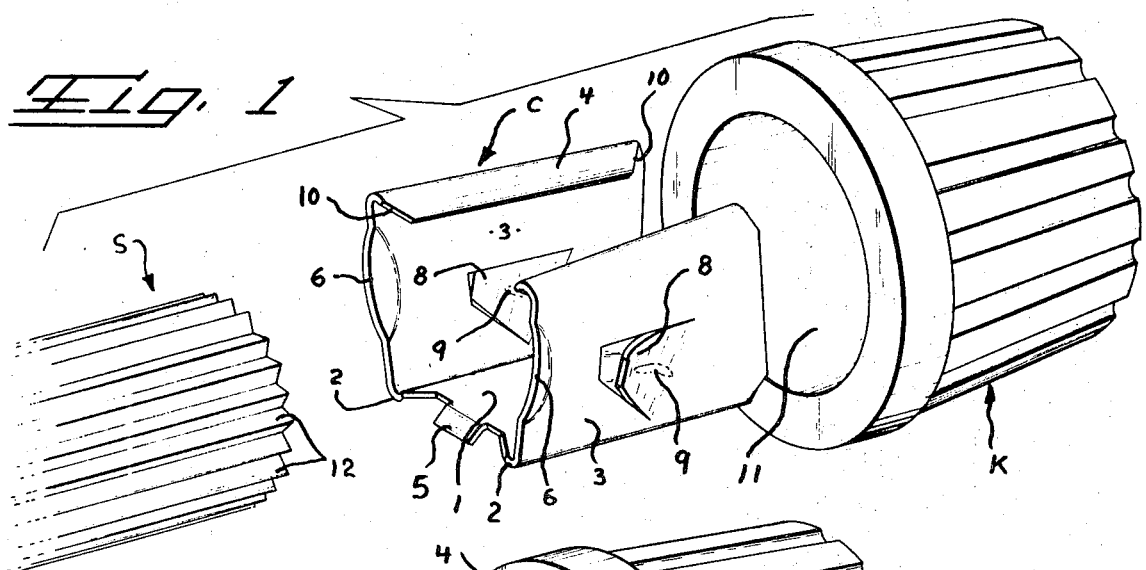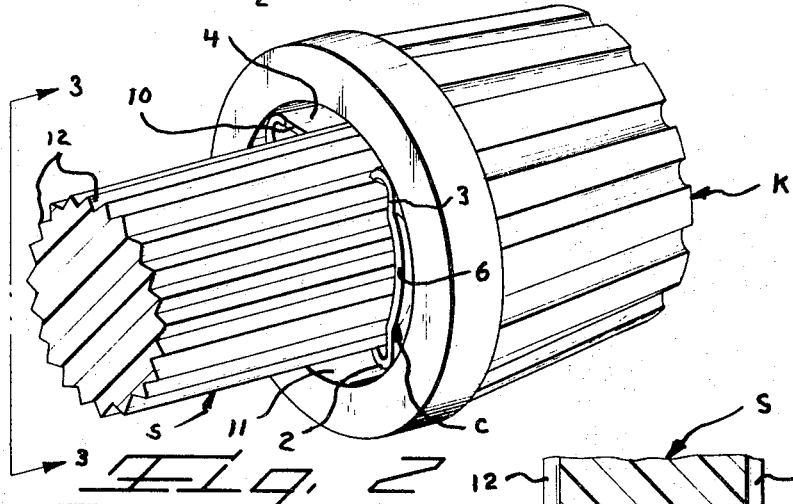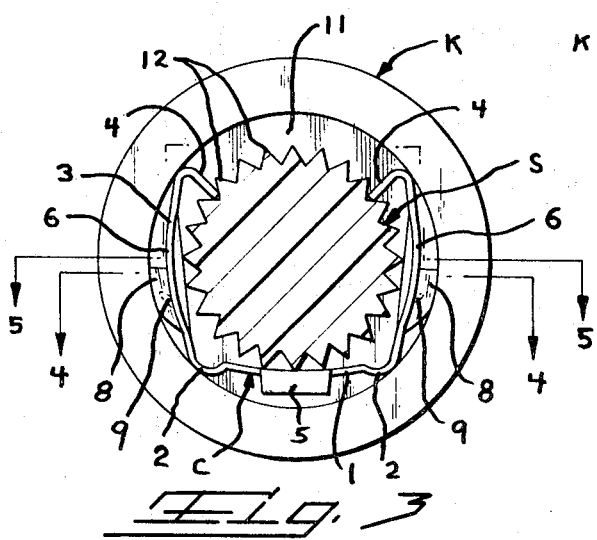

3,558,165
CLIPS TO HOLD KNOBS ON SHAFTS
Robert Graham Lundergan, Camp Hill, Pa., assignor to AMP Incorporated, Harrisburgh, Pa.
Filed Aug. 6, 1968, Ser. No. 750,647
Int. Cl. F16d 1/06
U.S. Cl. 287—53                                10 Claims

ABSTRACT OF THE DISCLOSURE

A clip to hold a knob on a shaft has a generally U-shaped configuration tapered from one end to the other and it is adapted to fit within a hollowed section of the knob. Projections with sharpened ends dig into the wall of the hollowed section to secure the clip therein and the free ends of the legs of the clip are inwardly directed to frictionally engage the shaft as the shaft moves within the clip, the base and legs of the clip being outwardly deformed by the shaft causing the free ends to dig into the shaft.

---

This invention relates to clips and more particularly to clips for retaining knobs on shafts.

Knobs for use on shafts are generally fabricated from plastic material and the knobs are maintained on the shafts via mateable areas of the knobs. Such knobs present problems because of proper orientation in order to assemble the knobs and repeated removals and reinsertions of the knobs onto the shafts enlarges the mateable areas causing the knobs to fit loosely on the shafts.

Some knobs are held onto shafts by means of set screws being screwed into engagement with the shafts. Such an approach has the drawback of scoring the shafts and thereby disfiguring the shafts which results in slipperage of the knobs on the shafts as well as damage to the knobs and in addition this approach is costly.

Knobs are also held in position on the ends of shafts via split sleeves having bell mouth ends secured within the knobs and the split sleeves are provided with inwardly-directed projections in a plane passing through the axis of each of the shafts to maintain the knobs on the shafts. In accordance with this approach, the knobs are properly secured on the shafts but they wobble which is an undesirable feature and therefore a drawback.

An object of the present invention is to provide a clip for securing within a knob, and the clip then maintains the knob on an end of a shaft without any wobble or disfiguring actions.

Another object is the provision of a clip having means to secure the clip within an opening of a knob such that rotary movement between the clip and knob is precluded.

A further object is to provide a knob clip which needs no polarizing or orientation means for mounting a knob onto an end of a shaft.

An additional object is the provision of a knob clip wherein the legs of the clip are bent inwardly toward each other at their free ends in a direction extending from the outer or trailing ends toward the inner or leading ends thereby providing a constant biasing force on an end of a shaft when a knob containing the clip is forcefully driven onto the shaft end.

Other objects and attainments of the present invention will become apparent to those skilled in the art upon a reading of the following detailed description when taken in conjunction with the drawings in which there are shown and described illustrative embodiments of the invention; it is to be understood, however, that these embodiments are not intended to be exhaustive nor limiting of the invention but are given for purposes of illustration in order that others skilled in the art may fully understand the invention and the principles thereof and the manner of applying it in practical use so that they may modify it in various forms, each as may be best suited to the conditions of a particular use.

Figure 5:
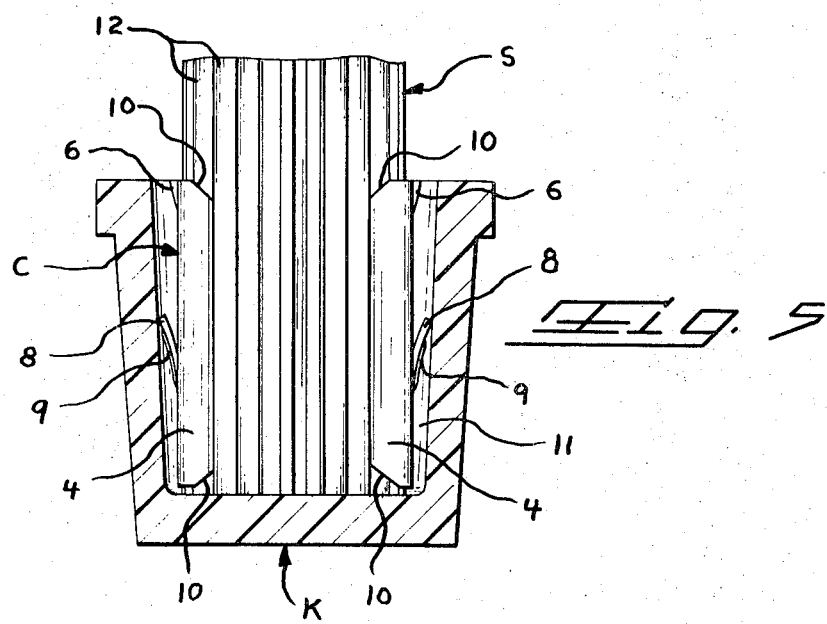
Figure 6:
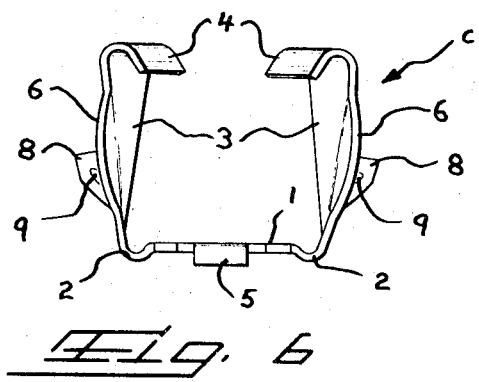
Figure 7:
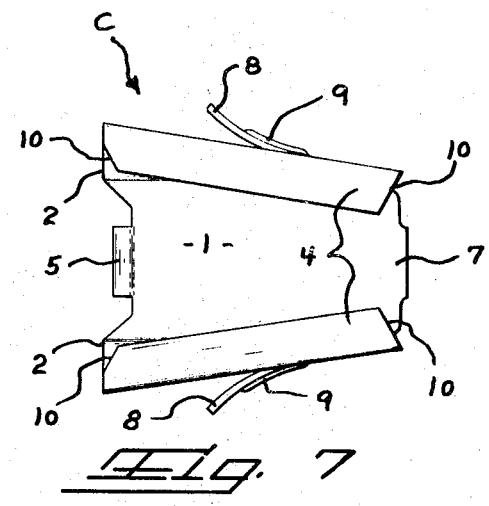
Figure 8:
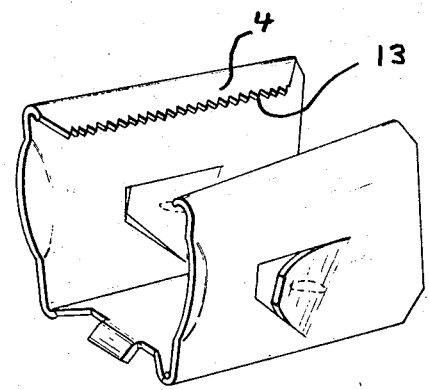

In the drawings:
FIG. 1 is an exploded perspective view of an end of a shaft, a clip and a knob;
FIG. 2 is a perspective view of FIG. 1 in an assembled condition;
FIG. 3 is a view taken along lines 3—3 of FIG. 2;
FIG. 4 is a view taken along lines 4—4 of FIG. 3;
FIG. 5 is a view taken along lines 5—5 of FIG. 3;
FIG. 6 is an end view of the clip looking inwardly from the trailing end of the clip;
FIG. 7 is a top plan view of a clip; and
FIG. 8 is a perspective view of an embodiment of the invention.

Turning now to the drawings and especially FIGS. 1 through 7, a clip C is used to secure a knob K in position on the end of shaft S. Clip C is susceptible to mass production by automatic machinery and is conveniently formed by shaping a sheet metal blank or strip of a suitable metal having proper spring characteristics such as, for example, steel or the like in successive forming steps.

Clip C is of generally U-shaped configuration and it is provided with a base 1 having at its outer edges outwardly-directed radiused projections 2 which merge into legs 3. The free ends of legs 3 are bent inwardly toward base 1 thereby providing rails 4 defining shaft-engaging members. Rails 4 are directed toward base 1 in an angular disposition as illustrated in FIG. 6.

The trailing end of base 1 is provided with a downwardly-directed tab 5 and the trailing ends of legs 3 are provided with outwardly-directed arcuate sections 6 which causes the legs 3 along the trailing ends thereof to have outwardly-directed configurations as illustrated in FIG. 6. Rails 4 are inclined toward each other from the trailing end of clip C to the leading end thereof as illustrated in FIGS. 6 and 7 which causes the leading ends of legs 3 to be directed toward each other from the base 1 to the free ends thereof as illustrated in FIG. 6. Thus, base 1 is of generally rectangular configuration such that radiused projections 2 are parallel with respect to one another and legs 3 are formed such that the trailing ends thereof have an outwardly-directed configuration while the leading ends thereof are directed toward one another. The leading end of base 1 is provided with a projection 7 which is formed as a result of clip C being severed from a carrier strip along which clip members C are disposed for carrying the clip members into position in an applicator for applying clips C to knobs.

Outwardly-curved securing members 8 are struck out from legs 3 and they have a generally triangular configuration with the apeces being directed toward the trailing end of the clip. If desired, ribs 9 may be formed in securing members 8 in order to strengthen these securing members. The leading and trailing ends of rails 4 are provided with beveled surfaces 10.

In assembly, clip C is forcefully driven into a hollow area 11 of knob K with the leading end of the clip leading the way. Knob K is generally made from a plastic material that can be plated with some metal or it can be made from a soft metal or metal alloy. When clip C has been driven into hollow area 11, it engages the wall of hollow area along projections 2 and along the transitions between legs 3 and rails 4 thereby forming a frictional engagement between the wall of hollow area 11 and clip C at these four points of engagement therebetween, and, of course, securing members 8 dig into the wall of hollow area 11 thereby securing clip C in position in hollow area 11. Since the points of securing members 8 are directed outwardly toward the entrance of hollow area 11, attempted removal of clip C from hollow area 11 will cause securing members 8 to dig deeper into their points of engagement with the wall of hollow area 11 thereby resisting removal of clip C from hollow 11 and requiring a great deal of effort to remove clip C from hollow area 11 which will cause a great deal of damage to the wall of hollow area 11. Thus, clip C is, for all intents and purposes, secured in a rather complete manner within hollow area 11 of knob K thereby forming a complete unit when clip C and knob K are assembled together.

With clip C securely positioned in hollow area 11 of knob K, knob K can now be mounted onto shaft S having serrations 12 along the exterior surface thereof. Arcuate sections 6 and tab 5 define guide means to guide the end of shaft S into clip C and beveled surfaces 10 at the trailing ends of rails 4 facilitate the engagement of rails 4 along respective serrations 12 of shaft S when the shaft is introduced within clip C. With the end of shaft S introduced within clip C and with rails 4 properly positioned within respective serrations 12 of shaft S, knob K is forcefully moved along shaft S causing rails 4 to be moved outwardly from each other thereby providing a constant biasing force on the shaft which is one factor causing the knob to be maintained on the end of shaft S. Another factor is that base 1 and legs 3 are caused to be bent in outwardly-directed directions which results in rails 4 being under greater pressure while in engagement with the respective serrations of the shaft thereby providing a cumulative frictional engagement of rails 4 onto the respective serrations.

More specifically, the proper alignment between knob K and shaft S is effected by having the rails 4 maintain the required distance between the knob K and the shaft S. The tolerances and slight discrepancies inherent in manufacture are compensated for by the flexing action of base 1. This principle of retention, namely two rigid rails opposed by the spring action of a flexible base, accomplishes the following:

(a) Maintains concentricity between the knob and shaft,
(b) Maintains parallelism between center lines of knob and shaft,
(c) Provides frictional retention force between the shaft and clip,
(d) Inhibits mutational or wobbling, motion between the knob and shaft, and
(e) Allows for tolerance accumulation of the parts involved.

Knob K can withstand repeated and numerous removals and insertions onto the end of shaft S without decreasing the retaining force provided by clip C, and knob K can be mounted on the end of shaft S in any angular disposition since no orientation feature is necessary to mount knob K on the end of shaft S. Once knob K has been installed on the end of shaft S, securing members 8 prevent knob K from slipping relative to clip C so that is securely positioned on the end of shaft S without any play or wobble thereby providing positive action on shaft S when knob K is operated.

Moreover, the movement of the inner ends of rails 4 away from each other and the bowing outwardly of the legs 3 as the clip moves along the shaft end causes the securing members 8 to dig deeper into the wall of the hollow area thereby enhancing the securing of the clip within the hollow area and the preclusion of any rotation of the knob relative to the clip.

If desired, serrated edges 13 can be provided at the free edges of rails 4, as illustrated in FIG. 8, in order to provide greater adhering characteristics onto the end of shaft S. Also, rails 4 may be disposed parallel with respect to each other instead of being inclined since such configuration would be effective to hold the knob on the end of the shaft due to the base and legs being bowed outwardly when the end of the shaft is received within the clip thereby causing the rails to be driven into tighter engagement with the shaft.

It will, therefore, be appreciated that the aforementioned and other desirable objects have been achieved; however, it should be emphasized that the particular embodiments of the invention, which are shown and described herein, are intended as merely illustrative and not as restrictive of the invention.

The invention is claimed in accordance with the following:

1. A clip for mounting a knob onto an end of a shaft comprising a generally U-shaped member having a base and legs extending outwardly therefrom with said member adapted to snugly fit within a hollow area of the knob, the majority of said base lying in a plane substantially parallel with the longitudinal axis of said shaft and adapted to engage a circumferential surface portion of said shaft, said legs having struck-out securing members provided with pointed areas for digging into a wall of the hollow area to secure said clip within the hollow area and to prevent the knob from rotating relative to said clip, rails located at the outer ends of said legs which extend inwardly toward each other and toward said base in an inclined manner, and arcuate-shaped junctures of said legs and said rails adapted to engage the hollow area wall for maintaining the rails in engagement with spaced areas of the shaft, said clip adapted to receive the end of the shaft therein with said rails engaging the spaced areas of the shaft thereby causing the rails to move away from each other at one end of said clip and said base and legs are bowed outwardly causing said rails to be driven into tighter engagement with said shaft thereby applying a constant biasing force on the shaft to maintain the clip on the shaft.

2. A clip according to claim 1 wherein a trailing end of said base is provided with a downwardly directed tab.

3. A clip according to claim 1 wherein trailing ends of said legs have outwardly-directed arcuate sections.

4. A clip according to claim 1 wherein free ends of said rails are smooth.

5. A clip according to claim 1 wherein free ends of said rails are serrated.

6. A clip according to claim 1 wherein said securing members have a generally triangular configuration having pointed ends directed toward a trailing end of said clip.

7. A clip according to claim 1 wherein outwardly-directed radiused projections are disposed at the junctures of said legs with said base.

8. In a knob adapted to fit on an end of a shaft, said knob having a hollow area provided with a wall, a clip in said hollow area, said clip including a base and side members extending outwardly therefrom, the majority of said base lying in a plane substantially parallel with the longitudinal axis of said shaft and adapted to engage a circumferential surface portion of said shaft, securing members extending outwardly from said side members and having pointed areas digging into said wall securing said clip in said hollow area and preventing rotation between said clip and knob, retaining members provided by said side members and spaced from said base, said retaining members being directed toward said base in an inclined manner and being directed toward each other in an inclined manner from an outer end of said clip to an inner end thereof, and arcuate-shaped junctures of said retaining members and said side members engaging said wall for maintaining said retaining members in engagement with spaced areas of the shaft, said clip adapted to receive therein the end of the shaft with the retaining members engaging the spaced areas along the end of the shaft thereby causing the retaining members to move away from each other at the inner end of said clip and said base and side members are bowed outwardly causing said retaining members to be driven into tighter engagement with said shaft thereby applying a constant biasing force on the end of the shaft to maintain the knob on the shaft.

9. A clip for mounting a knob onto an end of a shaft comprising a member having a base and side members extending outwardly therefrom wtih said member adapted to snugly fit within a hollow area of the knob, the majority of said base lying in a plane substantially parallel with the longitudinal axis of said shaft and adapted to engage a circumferential surface portion of said shaft, securing members extending outwardly from said side members, said securing members being provided with pointed areas for digging into a wall of said hollow area to secure said clip within the hollow area and to prevent the knob from rotating relative to said clip, retaining members provided by said side members and spaced from said base, said retaining members being directed toward said base in an inclined manner and being directed toward each other in an inclined manner from one end of said clip to another end thereof, and arcuate-shaped junctures of said retaining members and said side members adapted to engage the hollow area wall for maintaining said retaining members in engagement with spaced areas of the shaft, said clip adapted to receive therein the end of the shaft with the retaining members engaging the spaced areas along the end of the shaft thereby causing the retaining members to move away from each other at the other end of said clip and said base and said side members are bowed outwardly causing said retaining members to be driven into tighter engagement with said shaft thereby applying a constant biasing force on the end of the shaft to maintain the clip on the shaft.

10. A clip for mounting a knob onto an end of a shaft comprising a generally U-shaped member having a base and legs extending outwardly therefrom, outwardly-directed projections at junctures between said base and said legs, retaining members at free ends of said legs, said retaining members being directed toward said base in an inclined direction, said outwardly-directed projections and said free ends of said legs frictionally engaging a wall of a hollow area of the knob, securing members provided by said legs and having pointed areas for digging into the wall of the hollow area to secure said clip within the hollow area and to prevent the knob from rotating relative to said clip, said clip adapted to receive the end of the shaft therein with said retaining members engaging spaced areas of the shaft and said legs being bowed outwardly causing said retaining members to be driven into tighter engagement with the shaft thereby applying a constant biasing force on the shaft to maintain the clip on the shaft.

References Cited

UNITED STATES PATENTS

| 2,256,419 | 9/1941 | Tinnerman | 287—53H |
| 2,574,330 | 11/1951 | Judd | 292—353X |
| 2,733,083 | 1/1956 | Strange | 287—53H |
| 2,745,689 | 5/1956 | Balint et al. | 287—53H |

FOREIGN PATENTS

| 547,988 | 9/1942 | Great Britain | 287—53H |
| 171,179 | 8/1961 | Sweden | 287—53H |

DAVID J. WILLIAMOWSKY, Primary Examiner

A. KUNDRAT, Assistant Examiner

U.S. Cl. X.R.

74—353